United States Patent [19]

Saulnier

[11] 4,288,113
[45] Sep. 8, 1981

[54] QUICK CONNECTOR COUPLING FOR SEMI-RIGID HOSE

[75] Inventor: Charly J. Saulnier, Bonne, France

[73] Assignee: Parker-Hannifin Corporation, Cleveland, Ohio

[21] Appl. No.: 55,400

[22] Filed: Jul. 6, 1979

[51] Int. Cl.³ .............................................. F16L 33/00
[52] U.S. Cl. .................................... 285/238; 285/308; 285/340
[58] Field of Search ................. 285/340, 39, 315, 308, 285/238

[56] References Cited

U.S. PATENT DOCUMENTS

| | | | |
|---|---|---|---|
| 3,312,483 | 4/1967 | Leadbetter et al. | 285/340 |
| 3,679,241 | 7/1972 | Hoffmann | 285/340 |
| 3,837,687 | 9/1974 | Leonard | 285/340 X |
| 3,879,065 | 4/1975 | Kobayashi | 285/340 X |
| 4,123,090 | 10/1978 | Kotsukis | 285/340 |
| 4,146,254 | 3/1979 | Turner et al. | 285/340 X |

FOREIGN PATENT DOCUMENTS

| | | | |
|---|---|---|---|
| 2501823 | 7/1975 | Fed. Rep. of Germany | 285/340 |
| 1474023 | 2/1967 | France | 285/340 |
| 2368663 | 5/1978 | France | 285/39 |
| 6408516 | 1/1965 | Netherlands | 285/340 |

Primary Examiner—Dave W. Arola
Attorney, Agent, or Firm—Fisher, Christen & Sabol

[57] ABSTRACT

This quick connector coupling for semi-rigid hose or tube comprises a hollow body, a retaining ring and a push member, a movable abutment member limiting the opening movement of lugs formed in the retaining ring is resiliently fitted in the body by virtue of an elastic ring disposed downstream thereof.

4 Claims, 2 Drawing Figures

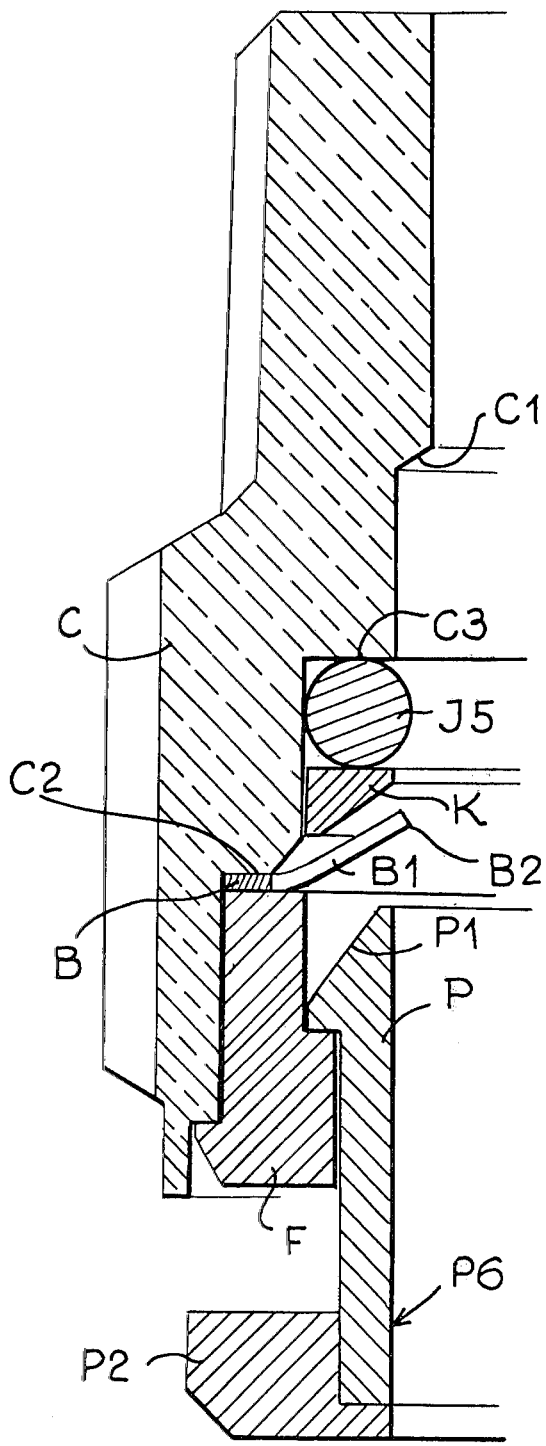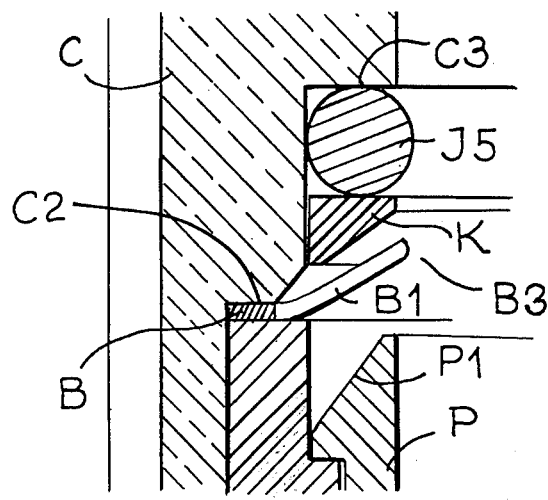
FIG. 1
FIG. 2

QUICK CONNECTOR COUPLING FOR SEMI-RIGID HOSE

BACKGROUND OF THE INVENTION

1. Field of the Invention

The present invention relates to a quick connector coupling for semi-rigid hose or tubes, notably plastic hose.

2. Description of the Prior Art

It is known, for example through the French Pat. No. 1,474,023 to Pneumalec S.A. filed on Jan. 21, 1966, to provide a coupling of this type wherein the hose is introduced axially into a body containing a retaining ring and a sealing member.

Basically, the retaining ring is an annular member formed with radial claws which undergo a deformation when the hose end is introduced into the device, but it is also known to obtain this deformation by means of an axial push member, notably when it is desired to pull the hose out from the coupling, as illustrated and described in the U.S. Pat. No. 3,837,687.

However, these known devices have serious inconveniences.

Thus, notably when introducing the hose end the claws of the retaining ring tend to scratch the external hose surface, by making grooves likely to jeopardize the fluid-tightness and to cause particles of hose material to be carried along by the fluid, and orifices included in the fluid circuit to be clogged by said particles.

Under these conditions, it is obvious that the claws should be somewhat spaced from the hose during the introduction of the hose end into the coupling body.

SUMMARY OF THE INVENTION

In order to bring a satisfactory solution to this problem, the present invention provides means for causing the hose to carry along the push member in such a way that the claws are spread apart by the push member until the hose has been introduced home to the desired axial position. The claw elasticity then moves the push member backwards, and the claws remain set into the hose material.

Beyond the ring, the body comprises a tapered portion dimensioned to restrict the claw opening or spreading movement, so that the claws are enclosed in the annular gap formed between this tapered portion and the push member.

Any tractive effort exerted on the hose will cause the claw ring to abute the push member, thus limiting also in this direction the claw distortion.

In the above-mentioned U.S. Pat. No. 3,837,687 there is described and claimed a quick-connector coupling for semi-rigid tube or hose, the coupling action being obtained by simply introducing the hose end into the device; this coupling comprises a hollow body having formed therein an internal abutment for limiting the hose introduction, a resiliently deformable ring of which the central annular portion comprises a plurality of lugs or claws adapted to be anchored in the hose material in order to prevent any outward movement of the hose, sealing means and a push member located centrally of the hose and adapted to spread said lugs apart, this coupling being characterised in that drive means are located between the outer wall of the hose and the inner wall of the push member, whereby when the hose is introduced into the device the push member is caused to contact or at least approach the claws of said ring.

According to one of the claims of this prior patent, an abutment member for limiting the lug distortion caused by said push member is provided.

Now in actual practice it appeared that due to variations occurring between the outer diameters of the hoses it was very difficult to set definitively the value of the maximal lug aperture.

BRIEF DESCRIPTION OF THE DRAWINGS

FIG. 1 is a cross-section taken on a plane passing through the central axis of a preferred form of coupling according to the invention but showing only one side, as the configuration is similar around the entire circumference, and FIG. 2 is a fragmentary view, similar to FIG. 1 and showing a modified form of gripping lug.

DESCRIPTION OF THE PREFERRED EMBODIMENT

This invention is directed to provide a simplified construction of a coupling of the type set forth hereinabove, having the specific and advantageous feature of affording a slight movement of the aperture limiting abutment, this movement being obtained through the inherent resiliency of the seal which has consequently a twofold function, that is, sealing the coupling and acting as a spring.

This improved construction therefore comprises a hose coupling of the type broadly disclosed hereinabove, consisting of a hollow body, a retaining ring and a push member, and characterised in that a movable abutment member limiting the opening of the ring claws is resiliently fitted in said body, this resiliency being provided by the seal located downstream of the ring.

Other features and advantages of the invention will appear as the following description proceeds with reference to the single Figure of the attached drawing illustrating diagrammatically a longitudinal and radial section of a hose coupling constructed according to the teachings of the present invention, as seen before introducing the hose end (not shown) into it.

As shown in the drawing, the hose coupling according to this invention comprises a hollow body C, in which three internal shoulders $C_1$, $C_2$ and $C_3$ are formed, a retaining ring B and a push member P.

When the hose end is introduced home into the device, it abuts the innermost shoulder $C_1$. The retaining ring B comprises an external annular portion engaging the shoulder $C_2$ and pressed against the internal shoulder $C_2$ by a socket F bonded to the body C for example by using a suitable adhesive.

The central portion of ring B is substantially frusto-conical and cut by radial slits so as to form a plurality of lugs $B_1$.

The push member P has a substantially tapered head $P_1$ so that it can act as a cam when pushed inwards by a force applied to its base $P_2$ so as to engage the lugs $B_1$ and spread them to permit the free passage of the hose guided by the bore $P_6$ of push member P.

For additional safety, the inner end of lugs $B_1$ may be bevelled or rounded on the internal face $B_3$ of the cone formed thereby, as shown in FIG. 2, so that if the controlled aperture is still insufficient the lugs $B_1$ will not damage the outer surface of the hose.

An O-ring or like seal $J_5$ engaging the shoulder $C_3$ between shoulders $C_1$ and $C_2$ is retained and pressed in its operative position by a triangular-sectioned ring K adapted at the same time to act as a stop limiting the spreading or bending of lugs B.

As clearly shown in the drawing, this O-ring $J_5$ has a twofold function: firstly, it permits a slight backward movement of ring K in case a variation in the diameter of the hose introduced into the device required an aperture greater than the normal aperture. Secondly, since the inner diameter of the O-ring $J_5$ is slightly inferior to the hose diameter, when the hose is introduced into the body C it compresses the O-ring, thus providing a tight seal between the hose and the body C, on the one hand, and tending to push the ring K inwards through the medium of the lugs $B_1$ so that these lugs will be forced to penetrate somewhat into the hose surface, on the other hand.

It will also be seen that the bevelled or rounded shape of the inner ends of the lugs permits this moderate penetration without any risk of damaging the hose.

Thus, any untimely disconnection of the hose is positively prevented since at requires the exertion of a voluntary action on the base $P_2$ of socket P for enlarging the aperture formed by the lugs $B_1$ and freeing the hose end.

Of course, various modifications and changes may be brought to the exemplary form of embodiment of the invention shown and described herein, without departing from the basic principles of the invention as set forth in the appended claims, as will readily occur to those conversant with the art.

What is claimed as new is:

1. A quick connector coupling for semi-rigid hose of the type providing a tight, self-gripping connection by simply inserting the hose end into the coupling, which comprises a hollow body having formed therein a first shoulder constituting an abutment for the hose end to limit the hose length that can be introduced into the coupling, a retaining ring having an external annular portion engaging a second shoulder of said hollow body and a central portion apertured and formed with a plurality of radial slits providing as many lugs adapted to grip said hose to counteract any outward movement thereof, means for locking the retaining ring in place, a push member adapted to slide in relation to said body and formed with an internal tapered head adapted to engage said lugs so as to bend them away from the hose surface when said push member is moved inwardly of said body and resilient sealing means disposed axially inwardly of said lugs, wherein abutment means is resiliently fitted in said hollow body axially inwardly of said lugs in order to permit a bending movement of said lugs by said push member to provide an aperture substantially greater than a normal movement and a normal aperture and to prevent an excess amount of said bending, said sealing means comprising an O-ring disposed between a shoulder provided in said hollow body and said abutment means to permit a slight axial movement of said abutment means.

2. A quick connector coupling as claimed in claim 1, wherein the inner ends of the lugs of said retaining ring is bevelled or rounded on the push-member side, so that said ends can slide on the external surface of the hose without damaging same.

3. A quick connector coupling as claimed in any one of claims 1 or 2, wherein said abutment means comprises an annular ring.

4. A quick connector coupling as claimed in any one of claims 1 or 2, wherein the surface of said ring facing said lugs in generally conically formed in conformity with the shape of said lugs when fully inwardly bent.

* * * * *